United States Patent
Kurschat et al.

(10) Patent No.: US 9,611,786 B2
(45) Date of Patent: Apr. 4, 2017

(54) ENGINE SYSTEMS WITH ENHANCED START CONTROL SCHEDULES

(75) Inventors: Ernest Kurschat, Phoenix, AZ (US); Yufei Xiong, Phoenix, AZ (US); Ron Haugland, Scottsdale, AZ (US); Craig E. Thompson, Gilbert, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1315 days.

(21) Appl. No.: 13/346,458

(22) Filed: Jan. 9, 2012

(65) Prior Publication Data

US 2013/0174570 A1 Jul. 11, 2013

(51) Int. Cl.
  *F02C 7/268* (2006.01)
  *F02C 7/275* (2006.01)

(52) U.S. Cl.
  CPC ............. *F02C 7/268* (2013.01); *F02C 7/275* (2013.01)

(58) Field of Classification Search
  CPC ... F02C 7/269–7/277; F02C 9/26; F02C 9/00; F05D 2260/85; F05D 2270/04
  See application file for complete search history.

(56) References Cited

U.S. PATENT DOCUMENTS

| | | | |
|---|---|---|---|
| 4,062,185 A | 12/1977 | Snow | |
| 4,062,186 A | 12/1977 | Snow et al. | |
| 4,597,259 A | 7/1986 | Moore et al. | |
| 5,107,674 A | 4/1992 | Wibbelsman et al. | |
| 5,349,814 A | 9/1994 | Ciokajlo et al. | |
| 5,735,116 A | 4/1998 | Mouton | |
| 5,845,483 A | 12/1998 | Petrowicz | |
| 6,672,049 B2 | 1/2004 | Franchet et al. | |
| 7,513,119 B2 | 4/2009 | Zielinski et al. | |
| 7,805,947 B2 | 10/2010 | Moulebhar | |
| 7,840,333 B2 * | 11/2010 | Mehrer et al. | 701/100 |
| 7,861,534 B2 | 1/2011 | Terlecki et al. | |
| 7,937,949 B2 | 5/2011 | Eccles et al. | |
| 2009/0069998 A1 | 3/2009 | Mehrer et al. | |
| 2009/0091133 A1 * | 4/2009 | Baker et al. | 290/34 |
| 2010/0300117 A1 | 12/2010 | Moulebhar | |
| 2011/0061396 A1 | 3/2011 | Dooley | |
| 2011/0185745 A1 | 8/2011 | Eccles et al. | |
| 2011/0288738 A1 * | 11/2011 | Donnelly et al. | 701/99 |

FOREIGN PATENT DOCUMENTS

| | | |
|---|---|---|
| CN | 101523031 A1 | 9/2009 |
| CN | 102135037 A | 7/2011 |
| GB | 756469 | 9/1956 |
| WO | 2011133569 A1 | 11/2011 |

OTHER PUBLICATIONS

Engines—Start (RB211); Taken from the Internet on Oct. 5, 2011 from http://www.biggles-software.com/software/757_tech/engines_and_apu/start.htm.

* cited by examiner

*Primary Examiner* — Andrew Nguyen
(74) *Attorney, Agent, or Firm* — Lorenz & Kopf, LLP

(57) ABSTRACT

An engine system for starting a gas turbine engine includes a starter coupled to the gas turbine engine and configured to provide torque to the gas turbine engine; and a controller coupled to the starter and configured to evaluate an engine system parameter and to select from a plurality of start modes for starting the gas turbine engine based on the engine system parameter.

17 Claims, 3 Drawing Sheets

ENGINE SYSTEMS WITH ENHANCED START CONTROL SCHEDULES

TECHNICAL FIELD

The present invention generally relates to gas turbine engines, and more specifically to engine systems and methods for controlling the gas turbine engines during start operations.

BACKGROUND

In many aircraft, gas turbine engines perform a number of functions, including providing propulsion for the aircraft and driving various other rotating components such as, for example, generators, compressors, and pumps, to thereby supply electrical and/or pneumatic power. Such engines may be incorporated into auxiliary power units (APU) that supplement main propulsion engines by providing electrical and/or pneumatic power.

A gas turbine engine typically includes a compressor section, a combustion section, and a turbine section. The compressor section compresses air provided at a forward end of the gas turbine engine and provides the compressed air to the combustor section. Fuel is added to the compressed air, and the resulting mixture is ignited within the combustion section to produce combustion gases. The combustion gases are directed to the turbine section, which extracts energy from the combustion gases to provide the motive force necessary to power the compressor section and auxiliary components, such that the gas turbine engine is self-sustaining.

In general, there are a number of ways to start the gas turbine engine, referred to below as "start modes." In conventional aircraft, the pilot selects the appropriate type of start mode. For example, one such mode is an assisted start mode in which an electric or pneumatic starter motor is used to initially provide a motive force to the shaft connecting the compressor section to the turbine section. The starter motor may be used to increase the speed of the compressor section to a point at which the compressed air provided to the combustion section results in a fuel/air mixture that is suitable for ignition (commonly referred to as "light-off"). Following light-off, the starter motor is discontinued when the gas turbine engine is self-sustaining (i.e., the power generated by the turbine section is sufficient to power the compressor section) such that the gas turbine engine does not require the motive force from the starter motor. In other situations, the start mode may be a windmill start mode in which the air flowing into the engine (as a result of forward motion or forced induction) is used to drive the compressors. As in the assisted start mode, the air flowing into the combustion section is mixed with fuel and ignited. The decision about start mode depends on a number of parameters and either mode may be more appropriate depending on the scenario. Typically, the pilot performs a sequence of steps to select the correct start mode. Inappropriate selection of start mode may result in incomplete and/or delayed starts, and/or excessive engine temperature conditions.

Accordingly, it is desirable to provide engine control systems that start a gas turbine engine in a more automatic and autonomous manner, particularly by providing selection of start mode by the engine control, rather than by the pilot. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an engine system for starting a gas turbine engine includes a starter coupled to the gas turbine engine and configured to provide torque to the gas turbine engine; and a controller coupled to the starter and configured to evaluate an engine system parameter and to select from a plurality of start modes for starting the gas turbine engine based on the engine system parameter.

In accordance with another exemplary embodiment, a method is provided for starting a gas turbine engine. The method includes evaluating, with a controller, a condition of a starter coupled to the gas turbine engine; selecting, with the controller, a start mode based on the condition of the starter; and generating acceleration commands based on the selected start mode.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein provide engine systems and methods associated with gas turbine engines. Particularly, the engine system is directed to starting the engine in a more automatic and autonomous manner. An engine controller may select the appropriate start mode of the engine based on a system parameter, such as current engine acceleration. For example, when the acceleration is greater than a predetermined acceleration rate, the engine controller may start the engine according to an assisted start mode in which the starter (or starter generator) assists in driving the engine up to a sustainable speed. As another example, when the acceleration is less than a predetermined acceleration rate, the engine controller may start the engine according to a windmill start mode in which the starter provided very little or no assist in driving the engine. Each start mode may have predetermined acceleration and fuel schedules.

Figure 1:
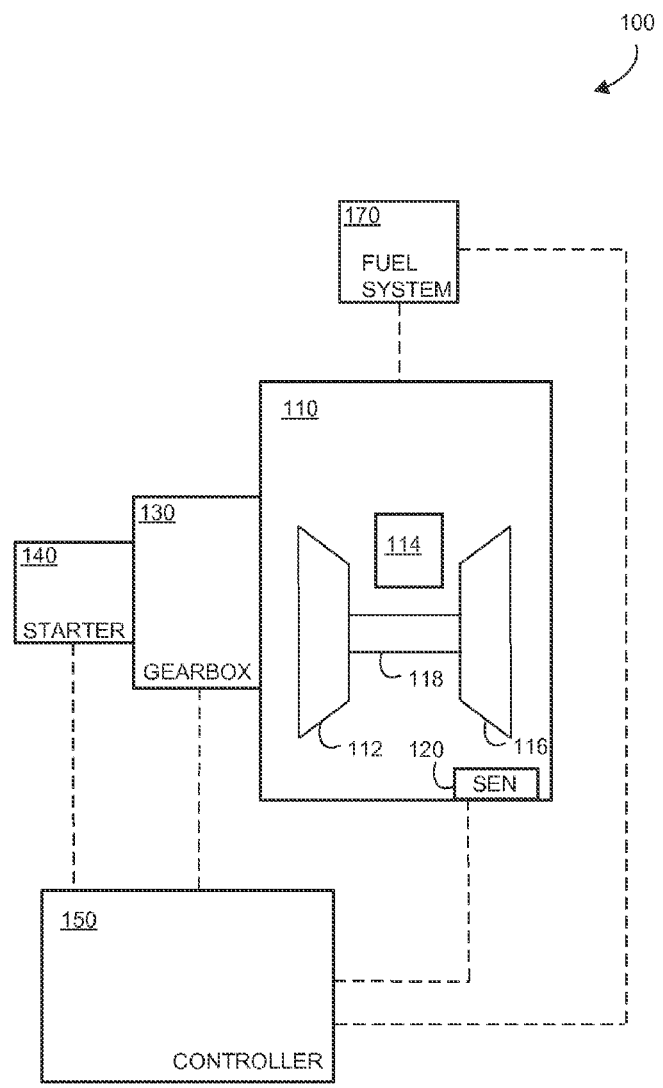
FIG. 1 is a schematic block diagram of an engine system in accordance with an exemplary embodiment.

FIG. 1 is a schematic representation of an exemplary aircraft engine system 100. The engine system 100 generally includes a gas turbine engine 110, a gearbox 130, a starter (or starter generator) 140, an engine controller 150, and a fuel system 170.

Typically, the engine 110 includes a compressor section 112, a combustion section 114, a turbine section 116, and a spool or shaft 118. During a typical running operation, the compressor section 112 draws in ambient air, compresses it, and directs it into a combustion section 114. The combustion section 114 receives the compressed air, mixes it with fuel from the fuel system 170, and ignites the resulting mixture to generate high energy combustion gases, which are directed into the turbine section 116. The high energy combustion gases expand through the turbine section 116, which in turn, drives the shaft 118 to produce mechanical power and/or electrical power. The gearbox 130 is coupled to the shaft 118 and provides or receives the mechanical energy from the shaft 118, various accessories, and the starter 140 as described below. The combusted gases exiting the turbine may be exhausted through an exhaust system (not shown). The schematic representation in FIG. 1 is merely one exemplary engine configuration, and the exemplary embodiments discussed herein are applicable to other types of configurations.

The engine 110 may be, for example, an auxiliary power unit (APU), although the engine system 100 described herein are also applicable to other types of engines, including propulsion engines. As described below, the engine 110 may further include any number of sensors for measuring engine characteristics, including an acceleration (or speed) sensor 120 for measuring or deriving the acceleration of some aspect of the engine, such as the shaft 118 or a rotor. In one exemplary embodiment, the system 120 may be located in the gearbox 130.

As noted above, the fuel system 170 is configured to deliver a flow of fuel to the combustion section 114 of the engine 110. As such, the fuel system 170 may include a tank or other source of fuel, valves, pumps, nozzles, and the like for providing a designated volume and rate of fuel.

The engine controller 150 generally controls the overall operation of the engine 110 as well as the fuel system 170. More specifically, the engine controller 150 receives signals from various sensors and systems and, in response to these signals, controls the engine 110 during start-up, operation, and shut-down. As examples, included among the signals supplied to the engine controller 150 may include speed or acceleration signals from sensor 120; an exhaust gas temperature (EGT) signal; and/or a fuel flow signal from the fuel system 170. The engine controller 150 may also receive external sensor signals from other sources, including signals such as the altitude of the aircraft and the ambient and/or total temperature. In response to these signals, the engine controller 150 provides command signals to various components, including the engine 110, the starter 140 and the fuel system 170. Additional details about operation of the engine controller 150 during start modes will be discussed below after a brief description of the other components of the engine system 100.

The starter 140 is coupled to the engine 110 through the gearbox 130. In one exemplary embodiment, the starter 140 is an electric starter and receives electrical power from an external power source, such as a battery or other AC or DC power source. In another exemplary embodiment, the starter is a pneumatically driven starter, and receives pneumatic power from an external power source, such as an APU or another engine.

In addition to coupling the starter 140 to the engine 110, the gearbox 130 may also drive mechanical accessories such as tachometers, generators or alternators, hydraulic pumps, fuel pumps, oil pumps, fuel controls, and water pumps with power from the engine 110 or starter 140. The gearbox 130 may include any number of gears, shafts, and clutches for transferring energy between the engine 110, starter 140, and the other accessories. As an example, the gearbox 130 may provide mechanical power to the fuel system 170.

The manner in which the engine controller 150 operates to control the engine 110 during start-up, operation, and shut-down may vary according to control logic stored in memory. In particular, and as will be described in more detail, the engine controller 150 provides command signals to the starter 140, engine 110, and the fuel system 170 according to the control logic.

As described below, the engine controller 150 may select the appropriate start mode of the engine 110, and exemplary modes may include a first assisted start mode, a second assisted start mode, and/or a windmill start mode. The start modes are introduced below prior to a more detailed description.

In the windmill start mode, the ram air and air entering the engine as a result of forward airspeed drive the engine 110. The engine controller 150 generates acceleration commands for the engine 110 and fuel commands for the fuel system 170 to deliver a designated amount of fuel to the engine 110 according to predetermined acceleration and fuel schedules. Typically, the windmill start mode does not involve mechanical assistance. In general, the windmill start mode requires sufficient aircraft forward airspeed to provide the aerodynamic assistance required for starting the engine. Accordingly, at low aircraft airspeeds, an attempted start in windmill start mode may result in undesirable issues, such as incomplete and/or delayed starts, and/or excessive engine temperature conditions. The windmill start mode is most appropriate when the starter 140 is unavailable and/or does not have sufficient capability to assist in driving the engine 110.

In the first and second assisted start modes, the engine controller 150 generates acceleration commands to drive the engine 110 and fuel commands for the fuel system 170 to deliver a designated amount of fuel to the engine 110 according to predetermined acceleration and fuel schedules. The first and second assisted start modes generally provide faster starts than the windmill start mode and are necessary when the airspeed of the aircraft is insufficient for the windmill start mode, e.g., when the aircraft is on the ground. The first assisted start mode is most appropriate when the starter 140 is capable of providing the highest level of torque desired by the engine 110. The second assisted start mode is most appropriate when the starter 140 is able to provide some torque but not the highest level that would otherwise be desired by the engine 110. Additional details about the start-up operation will be provided below with reference to FIG. 2.

Figure 2:
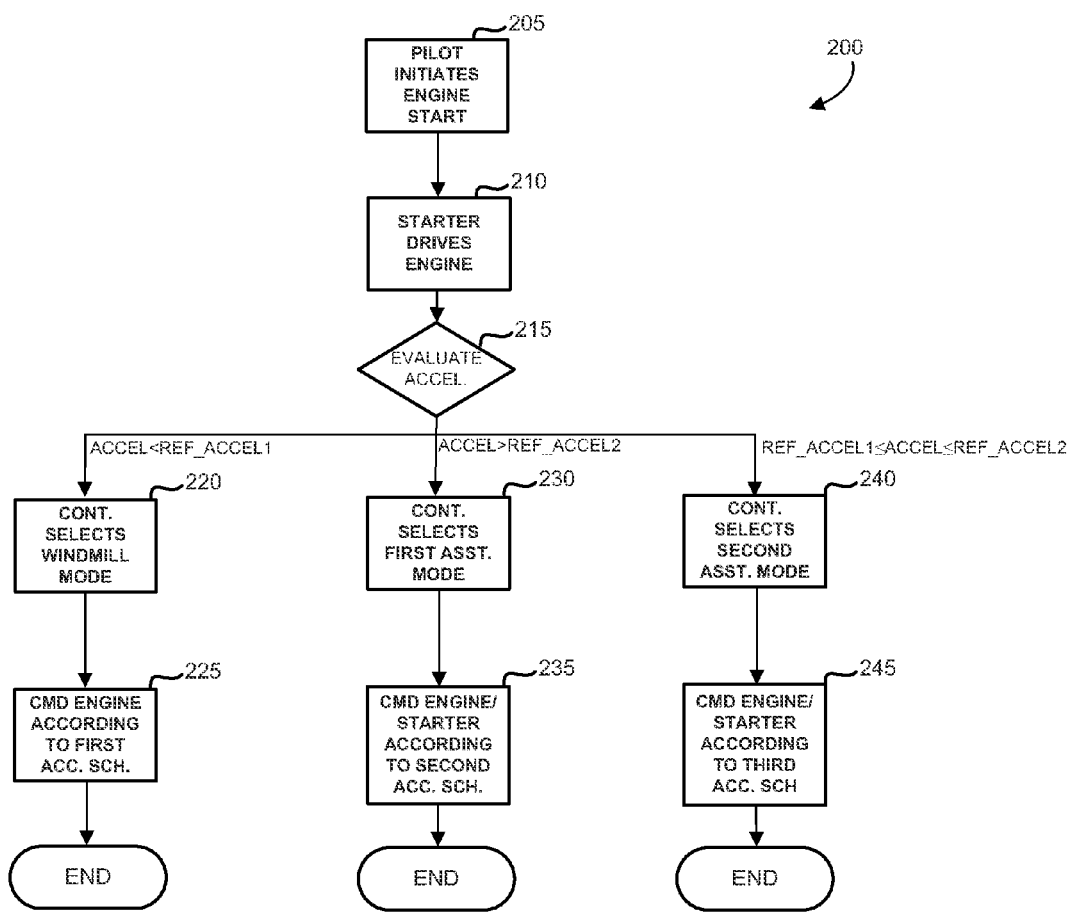
FIG. 2 is a flowchart depicting a method for starting the engine system of FIG. 1 in accordance with an exemplary embodiment.

FIG. 2 is a flowchart depicting a method 200 for starting an engine system in accordance with an exemplary embodiment. In one exemplary embodiment, the method 200 may be associated with the engine system 100 of FIG. 1. As such, FIG. 1 will be referenced below.

In a first step 205, a pilot initiates starting the engine 110, e.g., at a user interface in the cockpit. Typically, the pilot initiates a generic start operation and does not select a particular start mode.

In a second step 210, the engine controller 150 provides a command to the starter to assist the engine starting with the energy available or controlled to it. Any suitable start schedule may be used by the controller 150 in step 210.

In a third step 215, the engine controller 150 evaluates a system parameter. In general, the system parameter provides an indication of the current capability of the starter 140 to provide a sufficient amount of torque assistance to the engine 110. In one exemplary embodiment, the system parameter is engine acceleration. Engine acceleration (or speed) data may be provided by the sensor 120 within or proximate to the engine 110.

Depending on the speed or acceleration rate, the method 200 proceeds to steps 220, 230, or 240. In alternate embodiments, other system parameters may be used to evaluate the starter 140 assistance level. For example, the position of pneumatically activated valves may indicate the amount of pressure in a pneumatic starter, and thus, the level of available assistance. Other indications of starting assistance level available or being used could include starter electrical current, starter electrical voltage, or starter pressure levels. In some situations, more than one parameter may be used, such as the position of the value and acceleration. In the description below, acceleration is evaluated as the system parameter, although analogous methods may use other parameters or combinations of parameters.

If the acceleration rate is less than a first predetermined rate, the method 200 proceeds to step 220 in which the engine controller 150 initiates an engine start in windmill start mode. This level of acceleration indicates that the starter 140 may be unable to provide torque assistance. In step 225, the engine controller 150 provides acceleration and fuel commands to the engine 110 and fuel system 170, respectively, according to a first acceleration schedule and a first fuel schedule. Additional details about the acceleration and fuel schedules are provided below. In general, the windmill start mode continues until the engine 110 is ignited and reaches a predetermined, self-sustaining engine speed and/or an engine speed of 100%.

In step 215, if the acceleration rate is greater than a second predetermined rate, the method 200 proceeds to step 230 in which the engine controller 150 initiates an engine start in a first assisted start mode. This level of acceleration indicates that the starter 140 may be able to provide full torque assistance. In step 235, the engine controller 150 provides acceleration and fuel commands to the starter 140 and fuel system 170, respectively, according to a second acceleration schedule and a second fuel schedule. Additional details about the acceleration and fuel schedules are provided below. In general, the first assisted start mode continues until the engine 110 is ignited and reaches a predetermined, self-sustaining engine speed and/or an engine speed of 100%.

In step 215, if the acceleration rate is greater than or equal to the first predetermined rate and less than or equal to the second predetermined rate, the method 200 proceeds to step 240 in which the engine controller 150 initiates an engine start in a second assisted start mode. This level of acceleration indicates that the starter 140 may be able to provide partial torque assistance. In step 245, the engine controller 150 provides acceleration and fuel commands to the starter 140 and fuel system 170, respectively, according to a third acceleration schedule and a third fuel schedule. Additional details about the acceleration and fuel schedules are provided below. In general, the second assisted start mode continues until the engine 110 is ignited and reaches a predetermined, self-sustaining engine speed and/or an engine speed of 100%.

As noted above, if available, other indications of available starter assistance may be used in addition to or in place of acceleration. For example, if starter voltage is below a first predetermined value in step 215, the method 200 may proceed to step 220; if greater than a second predetermined value, to step 240; and if between the first and second predetermined values, to step 230. Additionally, acceleration and fuel schedules are discussed above, and below, as mechanisms for controlling the starter 140 and the engine 110. However, any suitable control technique may be used in the system 100 and method 200 described herein, including acceleration schedules, fuel flow/burner pressure schedules, fuel flow schedules, and the like.

Figure 3:
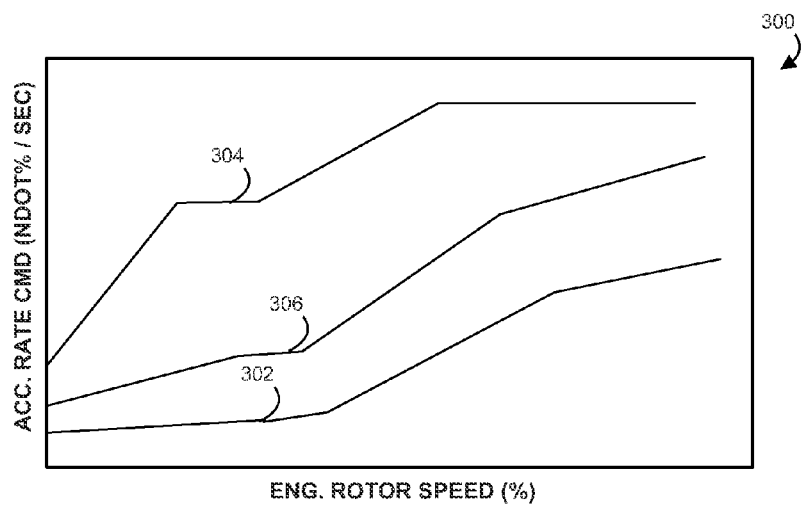
FIG. 3 is a chart depicting exemplary acceleration schedules for the engine system of FIG. 1 in accordance with an exemplary embodiment.

FIG. 3 is a chart 300 depicting exemplary acceleration schedules for the engine system 110 of FIG. 1 in accordance with an exemplary embodiment. Chart 300 represents the acceleration rate command as a function of engine rotor speed (in %/sec$^2$). As noted above, one exemplary schedule uses acceleration, although any suitable engine starting schedules may be used those expressed in raw measurements or "nondimensional" buckingham-pi corrected units, e.g., corrected to engine flight conditions.

In an embodiment with acceleration, three exemplary schedules 302, 304, and 306 are provided on the chart 300. Referring to FIG. 2, the first acceleration schedule 302 may correspond to the windmill start mode of steps 220 and 225; the second acceleration schedule 304 may correspond to the first assisted start mode of steps 230 and 235; and third acceleration schedule 306 may correspond to the second assisted start mode of steps 240 and 245. As shown, the first acceleration schedule 302 is more conservative with respect to acceleration rate as compared to the second and third acceleration schedules 304 and 306, and as such, is slower. However, as noted above, providing more aggressive acceleration commands in a scenario that is more appropriate for a windmill start may result in undesirable issues. The second acceleration schedule 304 is the relatively most aggressive acceleration schedule. The second acceleration schedule 304 provides the fastest engine start mode and is typically appropriate when the starter 140 is at full power to provide the necessary torque assistance to the engine 110. The third acceleration schedule 306 is the less aggressive than second acceleration schedule 304 and more aggressive than first acceleration schedule 302. The third acceleration schedule 306 provides a more moderate or intermediate engine start mode and is typically appropriate when the starter 140 is at less than full power, but more than zero power. In one exemplary embodiment, the third acceleration schedule 306 may be a function of the capability of the starter 140. In other words, the system 100 and method 200 may have a number of third acceleration schedules 306 depending on how the level of capability of the starter 140 and/or the third acceleration schedules 306 may be an algorithm that calculates the acceleration commands depending on the level of capability of the starter 140.

Figure 4:
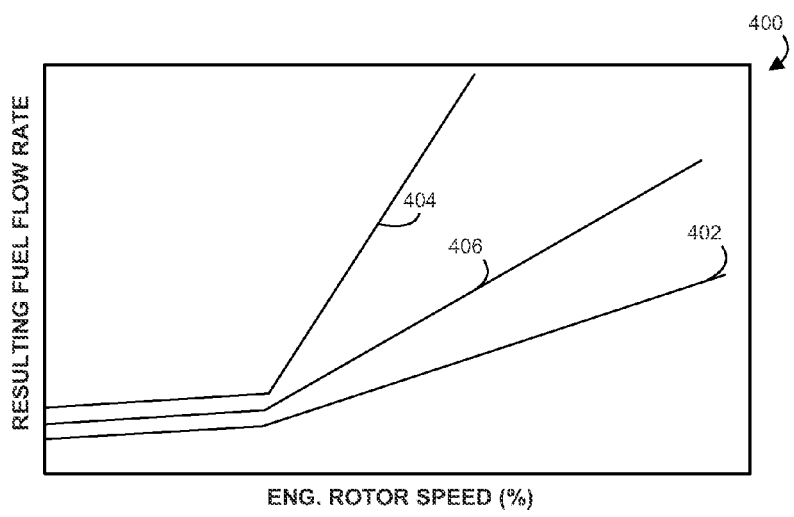
FIG. 4 is a chart depicting exemplary fuel schedules for the engine system of FIG. 1 in accordance with an exemplary embodiment.

FIG. 4 is a chart 400 depicting exemplary fuel schedules for the engine system 110 of FIG. 1 in accordance with an exemplary embodiment. Chart 400 represents the fuel rate command as a function of engine rotor speed. Three exemplary schedules 402, 404, and 406 are provided on the chart 400. Referring to FIG. 2, the first fuel schedule 402 may correspond to the windmill start mode of steps 220 and 225;

the second fuel schedule 404 may correspond to the first assisted start mode of steps 230 and 235; and the third fuel schedule 406 may correspond to the second assisted start mode of steps 240 and 245. As such, the fuel schedules 402, 404, and 406 may respectively correspond to acceleration schedules 302, 304, 306 discussed above in reference to FIG. 3.

As shown, the first fuel schedule 402 is more conservative with respect to fuel rate as compared to the second and third fuel schedules 404 and 406, and as such, may result in a slower start. However, as noted above, providing more aggressive fuel commands in a scenario that is more appropriate for a windmill start may result in undesirable issues. The second fuel schedule 404 is the relatively most aggressive fuel schedule. The second fuel schedule 404 provides the fastest engine start mode and is typically appropriate when the starter 140 is at full power to provide the necessary torque assistance to the engine 110. The third fuel schedule 406 is the less aggressive than second fuel schedule 404 and more aggressive than first fuel schedule 402. The third fuel schedule 406 provides a more moderate or intermediate engine start mode and is typically appropriate when the starter 140 is at less than full power, but more than zero power. In one exemplary embodiment, the third fuel schedule 406 may be a function of the capability of the starter 140. In other words, the system 100 and method 200 may have a number of third fuel schedules 406 depending on how the level of capability of the starter 140 and/or the third fuel schedule 406 may be an algorithm that calculates the fuel commands depending on the level of capability of the starter 140.

In general, the method 200 and system 100 enable the most appropriate selection of start mode, and as such, the most appropriate selection of fuel and acceleration schedules. Selecting the correct acceleration and fuel schedules provides improved temperature management, more efficient start operations, and more efficient fuel usage. The selection of the appropriate mode is typically performed by the system 100 and method 200 automatically, e.g., without undue decision making on the part of the pilot. In conventional systems, the pilot may have to perform numerous steps to evaluate the situation, select a start mode, and manually initiate the selected start mode. As such, in addition to providing a more efficient start procedure, the system 100 and method 200 reduce pilot workload and increase situational awareness.

The turbine engine start-up system and method may be implemented in wide variety of platforms, such as a computer system that includes a processor, an interface, a storage device, a bus, and a memory that stores the start logic as a program. The processor performs the computation and control functions of the controllers and may include any type of processor, including integrated circuits such as a microprocessor implemented on separate systems or as part of an overall vehicle control, navigation, avionics, communication or diagnostic system. During operation, the processor executes the programs contained within memory, which may be any type of suitable memory. The bus serves to transmit programs, data, status and other information or signals between the various components of engine system and may include any suitable physical or logical mechanisms of connecting computer systems and components.

It should be understood that while the systems and methods are described in the context of a fully functioning computer system, those skilled in the art will recognize that the mechanisms of the present invention are capable of being distributed as a program product in a variety of forms, and that the present invention applies equally regardless of the particular type of signal bearing media used to carry out the distribution. Examples of signal bearing media include: recordable media such as floppy disks, hard drives, memory cards and optical disks, and transmission media such as digital and analog communication links, including wireless communication links.

Although the systems and methods are described herein as being used with, for example, an aircraft gas turbine engine, it will be appreciated that it may be used in numerous other environments including, for example, space, marine, land, or other vehicle-related applications where gas turbine engines are used. It will be appreciated that numerous gas turbine engine configurations and implementations may be used, including propulsion engines and APUs. For example, the gas turbine engine could be used to drive one or more rotors of a helicopter, the gas turbine engine may be implemented as an APU, or the gas turbine engine may be used to supply power to any one of numerous other types of waterborne, airborne, or terrestrial vehicles.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An engine system for starting a gas turbine engine, comprising:
 a starter coupled to the gas turbine engine and configured to provide torque to the gas turbine engine; and
 a controller coupled to the starter and configured to evaluate an engine system parameter and to select from a plurality of start modes for starting the gas turbine engine based on the engine system parameter,
 wherein the plurality of start modes includes a first assisted start mode and a windmill start mode, and
 wherein the system parameter is engine acceleration of the gas turbine engine,
 and wherein the windmill start mode starts the gas turbine engine unassisted from the starter.

2. The engine system of claim 1, wherein, in the windmill start mode, the controller is configured to provide acceleration commands to the gas turbine engine according to a first acceleration schedule, and wherein, in the first assisted start mode, the controller is configured to provide acceleration commands to the starter according to a second acceleration schedule.

3. The engine system of claim 2, wherein the plurality of start modes further includes a second assisted start mode, and wherein, in the second assisted start mode, the controller is configured to provide acceleration commands to the starter according to a third acceleration schedule.

4. The engine system of claim 1, wherein the controller is configured to select the first assisted start mode at a first acceleration rate and the windmill start mode at a second acceleration rate, the first acceleration rate being greater than the second acceleration rate.

5. The engine system of claim 1, wherein the plurality of start modes further includes a second assisted start mode, and wherein the controller is configured to select the windmill start mode when the engine acceleration is less than a first predetermined acceleration rate, the first assisted start mode when the engine acceleration is greater than a second predetermined acceleration rate, and the second assisted start mode when the engine acceleration is greater than or equal to the first predetermine acceleration rate and less than or equal to the second predetermined acceleration rate.

6. An engine system for starting a gas turbine engine, comprising:
- a starter coupled to the gas turbine engine and configured to provide torque to the gas turbine engine; and
- a controller coupled to the starter and configured to evaluate an engine system parameter and to select from a plurality of start modes for starting the gas turbine engine based on the engine system parameter,
- wherein the plurality of start modes includes a first assisted start mode and a windmill start mode, wherein the system parameter is a starter condition that indicates an amount of torque assistance available to the gas turbine engine,
- and wherein the windmill start mode starts the gas turbine engine unassisted from the starter.

7. The engine system of claim 1, further comprising a fuel system configured to deliver fuel to the gas turbine engine, and wherein, in the windmill start mode, the controller is configured to provide fuel commands to the fuel system according to a first fuel schedule, and wherein, in the first assisted start mode, the controller is configured to provide fuel commands to the fuel system according to a second fuel schedule.

8. The engine system of claim 7, wherein the plurality of start modes further includes a second assisted start mode, and wherein, in the second assisted start mode, the controller is configured to provide fuel commands to the fuel system according to a third fuel schedule.

9. A method for starting a gas turbine engine, comprising the steps of:
- evaluating, with a controller, a condition of a starter coupled to the gas turbine engine, wherein the condition of the starter indicates an amount of torque assistance available to the gas turbine engine;
- selecting, with the controller, a start mode based on the condition of the starter from a plurality of start modes, wherein the plurality of start modes includes a first assisted start mode and a windmill start mode; and
- generating acceleration commands based on the selected start mode, wherein the windmill start mode starts the gas turbine engine unassisted from the starter.

10. The method of claim 9, wherein the generating step includes generating the acceleration commands for the gas turbine engine according to a first acceleration schedule in the windmill start mode, generating the acceleration commands for the starter according to a second acceleration schedule in the first assisted start mode.

11. The method of claim 10, wherein the plurality of start modes further includes a second assisted start mode, and wherein the generating step further includes generating acceleration commands for the starter according to a third acceleration schedule in the second assisted start mode.

12. The method of claim 9, wherein the evaluating step includes evaluating engine acceleration of the gas turbine engine as an indication of the condition of the starter.

13. The method of claim 12, wherein the selecting step includes
- selecting the first assisted start mode at a first acceleration rate, and
- selecting the windmill start mode at a second acceleration rate, the first acceleration rate being greater than the second acceleration rate.

14. The method of claim 12, wherein the plurality of start modes further includes a second assisted start mode, and wherein the selecting step includes selecting the windmill start mode when the engine acceleration is less than a first predetermined acceleration rate, selecting the first assisted start mode when the engine acceleration is greater than a second predetermined acceleration rate, and selecting the second assisted start mode when the engine acceleration is greater than or equal to the first predetermined acceleration rate and less than or equal to the second predetermined acceleration rate.

15. The method of claim 9, further comprising the steps of generating, in the windmill start mode, fuel commands for a fuel system configured to deliver fuel to the gas turbine engine according to a first fuel schedule, and generating, in the first assisted start mode, fuel commands for the fuel system configured to deliver fuel to the gas turbine engine according to a second fuel schedule.

16. The method of claim 15, wherein the plurality of start modes further includes a second assisted start mode, and wherein the method further comprises the step of
- generating, in the second assisted start mode, fuel commands for the fuel system according to a third fuel schedule.

17. The engine system of claim 6, wherein the system parameter is engine acceleration of the gas turbine engine.

* * * * *